United States Patent Office 2,907,754
Patented Oct. 6, 1959

2,907,754
VISCOSITY STABILIZATION OF POLYAMIDES WITH ORTHO-AROMATIC DIAMINES

Frank Howlett, Kenneth Butler, and John Alexander Low, Newport, England, assignors to British Nylon Spinners Limited, Pontypool, England, a corporation of Great Britain No Drawing. Application March 1, 1954
Serial No. 413,452

Claims priority, application Great Britain March 5, 1953

4 Claims. (Cl. 260—78)

The present invention relates to improvements in the manufacture of polymers and more particularly to the manufacture of linear polyamides of high molecular weight, and of filaments, films and other shaped articles therefrom.

Linear polyamides of high molecular weight suitable for the production of filaments and other shaped articles, may be made by submitting an amino-carboxylic acid or else a diamine and a dicarboxylic acid to a process of condensation polymerisation as described in British specifications Nos. 461,236 and 461,237, for example, by heating omega amino-caproic acid or a mixture of equimolecular proportions of hexamethylene diamine and adipic acid. Instead of the amino acid or amine and acid, functional derivatives thereof capable of forming amides, may be employed. For instance, an ester of the dicarboxylic acid or the lactam of the amino acid may be used. The degree of polymerisation attained may be controlled by the physical conditions employed, e.g. the duration of the heating, but the resulting polyamide would then be sensitive to further heat, which is applied for the purpose of shaping the polyamide into filaments and other useful articles, when the polyamide is melt-spun. When heated again, such a polyamide would undergo further condensation, causing an increase in the average molecular weight and a rise in viscosity. It has consequently been the practice to make use of certain chemical compounds or additives known as viscosity stabilisers during the course of the condensation. As the name indicates, these compounds are added in order to control the viscosity, or, in other words, the degree of polymerisation or the average molecular weight of the polyamide. Thus it has been proposed in British specification No. 495,790 to make polyamides in the presence of monofunctional amide-forming compounds or substances which yield such compounds under the reaction conditions, for example, acids, e.g. lauric acid, monoamines such as methylamine, dimethylamine and cyclohexylamine and other compounds. It has now been found that bifunctional compounds, namely aromatic diamines containing the amino groups in the ortho position, which moreover appear to react as monofunctional compounds, are useful as viscosity stabilizers in the manufacture of polyamides. The simplest example of the aromatic diamines in question is o-phenylene diamine. The inclusion of such diamines in the polyamide condensation is advantageous compared with the addition of acid compounds as stabilisers, in that the diamines yield polyamides containing a higher proportion of amine groups, which facilitate the uptake of acid dyestuffs. Moreover the present diamines are generally considerably less volatile than the corresponding monoamines and consequently less likely to escape from the hot reaction zone.

Accordingly, the invention relates to a process for the manufacture of high molecular linear polyamides, comprising heating an amino acid or an approximately equimolecular mixture of a diamine and a dicarboxylic acid, which amino acid and/or diamine and/or dicarboxylic acid may be in the form of amide-yielding functional derivatives, or a polyamide obtained from said amino acid or diamine and dicarboxylic acid, which may be in the form of amide-yielding functional derivatives, in the presence of a molecular proportion of less than four percent (calculated on the aforesaid amino acid or dicarboxylic acid or functional derivative thereof) of an ortho aromatic diamine, namely ortho phenylene diamine or derivatives thereof having substituents joined to carbon, or in place of one of the hydrogen atoms of one of the amino groups, such as alkyl, aryl, alkoxy, aryloxy, aralkyl, or nitro groups, or halogen atoms, which substituents may constitute fused carbocyclic or heterocyclic rings but do not react with amino or carboxy groups or functional derivatives of these groups.

The ortho aromatic diamine may be added at any stage of the polymerisation which may be regarded as continuing until the substantial attainment of the chemical equilibrium between polymerisation and depolymerisation corresponding to the required degree of polymerisation. The polymerisation may be carried out continuously or batchwise, or indeed in separate stages. The invention includes filaments, films and other shaped articles made from the present polyamides. For example, the polyamides may be melted and spun from the melt into filaments. It is thus also contemplated to add the ortho aromatic diamine of the invention to such a melt, whereupon the polymerisation-depolymerisation equilibrium of the previously unstabilised polyamide will be re-adjusted so as to correspond to the required degree of polymerisation.

By way of acid and/or amine starting materials there may be employed, for instance, omega aminocaproic acid, epsilon caprolactam, pentamethylene diamine and sebacic acid, hexamethylene diamine and adipamide, decamethylene diamine and ethyl adipate, hexamethylene diamine and adipic acid, decamethylene diamine and adipyl chloride, hexamethylene diammonium adipate, omega aminolauric acid or hexamethylene diamine and sebacic acid.

Examples of ortho aromatic diamines which may be used according to the invention are:

1-methyl-2:3-diaminobenzene
1-methyl-3:4-diaminobenzene
1:2-diaminonaphthalene
2:3-diaminonaphthalene
5:6-diaminoquinoline
1-nitro-3:4-diaminobenzene
o-Phenylene diamine
N-ethylphenylene diamine
N-methylphenylene diamine
1:2-dimethyl-3:4 diaminobenzene
1:2-dimethyl-4:5-diaminobenzene
1:3-dimethyl-4:5-diaminobenzene
1:4-dimethyl-2:3-diaminobenzene
9:10-diaminophenanthrene
2:3-diaminophenazine
3:4-diaminotriphenylmethane
4:5-diaminoacenaphthene
3:4-diaminoacenaphthene
1:2-diaminoanthraquinone
2:3-diaminoanthraquinone
2:3-diaminobenzophenone
3:4-diaminobenzophenone
3:4-diaminocarbazole
2:3-diaminocarbazole
3:4-diaminodiphenyl
2:3-diaminodiphenyl oxide
2:3-diaminofluorene
1:2-diaminofluorene
1-chloro-3:4-diaminobenzene The present ortho aromatic diamines may be added as such or if desired in the form of their salts e.g. o-phenylene diamine hydrochloride, o-phenylene diamine adipate. The diamines or their salts may be used dry or in the form of their solutions, as deemed more expedient. A molecular proportion of one or two percent (calculated on the quantity of acid from which the polyamide is made) of the ortho aromatic diamine chosen is usually suitable. More or less may be employed if desired, provided it be less than 4%, but preferably the proportion employed ranges from ½% to 2½%.

The condensation polymerisation may be carried out in the absence of air or oxygen and, optionally, in the presence of an inert gas such as nitrogen. Provision may be made, if desired, for the absorption or removal of water, hydrogen chloride or other compound that may be eliminated during the course of the condensation, which may be effected in the presence or absence of an inert dilutent e.g. benzene, to moderate the vigour of the reaction. Delustrants, pigments, dyestuffs, plasticisers and other additives may be introduced into the polyamide at any stage of the polymerisation, or included in the starting materials, or added to the final polyamide.

When the polyamide is being made, the course of the polymerisation may be followed by measuring the viscosity. For this purpose it is convenient to determine the "Relative Viscosity" (expressed in abbreviated form as "R.V.") of the polyamide which is defined as the ratio of the viscosity of an 8.4% weight by weight solution of the polyamide in 90% aqueous formic acid at 25° C., to the viscosity of 90% aqueous formic acid at the same temperature. Thus the further the polymerisation proceeds, the higher becomes the Relative Viscosity of the polyamide. When the polyamide is adequately stabilised, additional heating produces little or no further change in the Relative Viscosity because equilibrium has been attained, or very nearly attained. Moreover, the degree of polymerisation reached at equilibrium, and hence the ultimate value of the Relative Viscosity, depend on the quantity of stabiliser employed, and on its effectiveness. Consequently the usefulness of a stabiliser can be gauged by measuring the Relative Viscosity of the resultant polyamide.

As already indicated, the employment of the present diamines facilitates the dyeing of the polyamides with acid dyestuffs. The advantage of the diamines from the dyeing point of view is conveniently estimated by measuring the uptake of an anionic dyestuff when the dyeing process has reached equilibrium, which is known as the Equilibrium Dyestuff Uptake (abbreviated as E.D.U.). Equilibrium anionic dyestuff uptake measurements are referred to at p. 625 of the Journal of the Textile Institute, vol. 41, No. 7, July, 1950 in an article entitled "Measurement of Dyeing Properties and Correlation with Orientation in Nylon Yarn." In testing the present polyamides, the following dyeing recipe has been used:

0.06% Naphthalene Scarlet 4R
0.15% sodium hydroxide
0.5% acetic acid (glacial)
Ratio of liquor to polyamide, 100:1
Temperature, 90° C.

The polyamide is immersed in the dye liquor, maintained at 90° C., and kept there until equilibrium is attained, that is, until dyestuff ceases to be taken up. The uptake of dyestuff may be measured directly on the dyed polyamide, or indirectly by determining the dyestuff still remaining in the dye liquor. In either case the quantity of dyestuff is determined colorimetrically, the dyed polyamide being first dissolved, e.g. in o-chlorophenol.

The following examples, in which the parts are parts by weight, illustrate but do not limit the invention.

Example 1

225 parts of hexamethylene diammonium adipate are placed together with 150 parts of water and 1.02 part of ortho-phenylene diamine (corresponding to a molecular proportion of 1.1%) in a stainless steel autoclave heated by a jacket, the latter being maintained at 290° C. The air is swept from the autoclave by a current of oxygen-free nitrogen, and the autoclave closed by a loaded valve, arranged so that the pressure cannot rise above 250 lbs. per sq. in. This pressure is reached in the course of about 1 hour, and the heating continued for a further 150 minutes. The pressure is then allowed slowly to fall to 1 atmosphere. The temperature of the molten polyamide, now 280° C., is maintained for 40 minutes. The resulting polyamide is extruded as a ribbon, converted into chips and melt spun into yarn by known processes (cf. British specifications Nos. 533,306 and 533,307).

The Relative Viscosity (R.V.) of the chips and that of the yarn are determined. The Equilibrium Dyestuff Uptake of the ground polymer is also measured. Further, by suitable titration methods, the residual amino end groups (abbreviated as A.E.G.) and the residual carboxy end groups (abbreviated as C.E.G.) in the polyamide, are determined. The results are expressed as gram equivalents per $10^6$ grams.

The above data are tabulated below together with similar data relating to a polyamide made by using acetic acid as stabiliser in place of the ortho-phenylene diamine.

| Stabilizer | o-phenylene diamine | acetic acid |
|---|---|---|
| R.V. (of polyamide chips) | 31.2 | 31.2 |
| R.V. (of polyamide yarn) | 33.5 | 33.0 |
| A.E.G | 95 | 38 |
| C.E.G | 58 | 97 |
| E.D.U. (1) | 2.2 | 1.3 |
| E.D.U. (2) | 5.2 | 2.8 |
| Colour | white | white |

NOTE.—In the foregoing table E.D.U. (1) refers to ground polyamide dyed with Naphthalene Scarlet 4R, and E.D.U. (2) to polyamide yarn dyed with Naphthalene Red J.

It will be observed from the foregoing figures that the ortho-phenylene diamine not only acts as an efficient stabiliser but also affords a polyamide of enhanced dyeability in regard to anionic dyestuffs. Furthermore, if yarn of the polyamide made with orthophenylene diamine as stabiliser is knitted into a fabric and dyed with Solway Blue BN or Durazol Blue 2R, much deeper shades are obtained than in the case of fabric knitted from yarn of the polyamide made by using acetic acid as stabiliser.

Example 2

26½ parts of hexamethylene diammonium adipate are mixed with 1/10 part of ortho-phenylene diamine, which corresponds to a molecular proportion of one percent. The resulting mixture is heated in a sealed tube filled with nitrogen at 215° C. for three hours under pressure. The tube is then opened and the heating continued at 285° C. for 1½ hours under atmospheric pressure, a stream of nitrogen being passed through the tube. The resulting polyamide compares as follows with a similar one made employing acetic acid as stabiliser instead of the o-phenylene diamine:

| Stabilizer | o-phenylene diamine | acetic acid |
|---|---|---|
| R.V. (of polyamide chips) | 34.4 | 32.9 |
| A.E.G | 103 | 40 |
| E.D.U. (of ground polyamide with Naphthalene Scarlet 4R) | 2.4 | 1.0 |
| Colour | white | white |

The superior dyeability of the present polyamide is evident.

Example 3

A polyamide of short chain length is made by heating hexamethylene diammonium adipate at 220° C. in a sealed vessel for 3 hours. To 10 parts of the resulting polymer are added 0.046 part of ortho-phenylene diamine. The mixture is heated at 285° C. under nitrogen at atmospheric pressure for 30 minutes. The properties of the final polyamide compared with those of a polyamide stabilised with acetic acid and of an unstabilised polyamide, are as follows:

| Stabilizer | o-phenylene diamine | acetic acid | none |
|---|---|---|---|
| R.V. | 34.5 | 32.9 | 46.9 |
| A.E.G. | | 40 | |

The amine end group content of the polyamide stabilised with ortho phenylene diamine is far above 40, thus indicating its improved dyeability in respect to acid dyestuffs.

Example 4

Example 1 is repeated except that the ortho-phenylene diamine is omitted. Of the resulting polyamide (to be designated A) two portions, to be called respectively B and C, are taken. To portion B there is added ½ part ortho-phenylene diamine for every 100 parts. The portions of polyamide B and C are then heated for 1 hour at 285° C. under nitrogen at atmospheric pressure. The final Relative Viscosities are as follows:

| Polyamide | A | B | C |
|---|---|---|---|
| R.V. | 41.5 | 34.9 | 52.5 |

These results demonstrate the stabilising action of the ortho-phenylene diamine.

Example 5

Example 2 is repeated, the ortho-phenylene diamine being replaced by 1-methyl-3:4-diaminobenzene (molecular proportion 2%). (See table following Example 6.)

Example 6

Example 2 is repeated, the ortho-phenylene diamine being replaced by 1:2-dimethyl-3:4-diaminobenzene in molecular proportions of 1% and 2%.

The results of Examples 5 and 6 follow in tabular form:

| Example | Stabilizer used | R.V. | A.E.G. | E.D.U. | Colour |
|---|---|---|---|---|---|
| 5 | 2% 1-methyl-3:4-diaminobenzene | 21.6 | 160 | | white |
| 6 | 1% 1:2-dimethyl-3:4-diaminobenzene | 32.3 | 117 | 3.1 | white |
| | 2% 1:2-dimethyl-3:4-diaminobenzene | 23.5 | 169 | | white |

Below are quoted in a table data relating to polyamides made by using other examples of stabilisers according to this invention, in place of the ortho-phenylene diamine of Example 2. The efficient stabilising action is indicated in each case by the R.V. figures and the good dyeability with acid dyestuffs by the high amine end group content.

| Example | Stabilizer | Molecular percent | R.V. | A.E.G. | Colour |
|---|---|---|---|---|---|
| 7 | 1:2-diaminonaphthalene | 1 | 33.7 | 108 | light brown. |
| 8 | do | 2 | 25.0 | 161 | Do. |
| | 1-chloro-3:4-diamino benzene | 1 | 36.2 | 102 | pale orange. |
| 9 | do | 2 | 2.2 | 151.5 | Do. |
| | N-methyl-o-phenylene diamine | 2 | 27.8 | 134 | nearly white. |

What we claim is:

1. A process for the manufacture of high molecular weight linear fiber-forming polycarbonamides which comprises heating and polycondensing a material selected from the group consisting of amino carboxylic acids and an approximately equimolecular mixture of a hydrocarbon diamine and a hydrocarbon dicarboxylic acid, and amide-forming functional derivatives thereof, together with a molecular proportion of from 0.5% to less than 4%, based on the quantity of acid in said material, of an aromatic compound the aromatic ring of which is substituted by two amino groups in positions ortho to each other and selected from the class consisting of unsubstituted amines and monoalkyl substituted amines, only one of said amino groups being substituted, any other substituent on the aromatic ring being selected from the group consisting of alkyl, aryl, alkoxy, aryloxy, aralkyl, nitro, and halogen, said heating being at a temperature above the melting point of said material and said aromatic amino compound.

2. The process of claim 1 wherein said compound has the formula

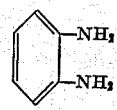

3. The process of claim 2 wherein said material is an approximately equimolecular mixture of hexamethylene diamine and adipic acid.

4. The process of claim 1 wherein said molecular proportion is from 0.5% to 2.5%.

References Cited in the file of this patent

UNITED STATES PATENTS

| | | |
|---|---|---|
| 2,278,350 | Graves | Mar. 31, 1942 |
| 2,625,536 | Kirby | Jan. 13, 1953 |

FOREIGN PATENTS

| | | |
|---|---|---|
| 906,892 | France | June 4, 1945 |
| 632,997 | Great Britain | Dec. 5, 1949 |